United States Patent
Mac an tSaoir et al.

(10) Patent No.: US 10,157,220 B2
(45) Date of Patent: *Dec. 18, 2018

(54) CONTEXT SENSITIVE QUERY EXPANSION

(71) Applicant: International Business Machines Corporation, Armonk, NY (US)

(72) Inventors: Seamus R. Mac an tSaoir, Navan (IE); Daniel J. McCloskey, Dublin (IE); Ahmed M. M. R. Salem, Dublin (IE); Mikhail Sogrin, Kildalkey (IE)

(73) Assignee: International Business Machines Corporation, Armonk, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/807,850

(22) Filed: Jul. 23, 2015

(65) Prior Publication Data
US 2017/0024461 A1 Jan. 26, 2017

(51) Int. Cl.
*G06F 17/30* (2006.01)
*G06F 17/27* (2006.01)

(52) U.S. Cl.
CPC .... *G06F 17/30672* (2013.01); *G06F 17/2785* (2013.01); *G06F 17/30675* (2013.01); *G06F 17/30684* (2013.01)

(58) Field of Classification Search
CPC ........... G06F 17/30672; G06F 17/2785; G06F 17/2795
See application file for complete search history.

(56) References Cited

U.S. PATENT DOCUMENTS

| 5,875,446 A | * | 2/1999 | Brown | G06F 17/30864 |
| 7,493,253 B1 | * | 2/2009 | Ceusters | G06F 17/2775 |
| | | | | 704/10 |
| 7,636,713 B2 | | 12/2009 | Jadhav | |
| 7,831,588 B2 | | 11/2010 | Jones et al. | |
| 8,566,363 B2 | | 10/2013 | Fang | |
| 8,577,907 B1 | | 11/2013 | Singhal et al. | |
| 2003/0004966 A1 | * | 1/2003 | Bolle | G06F 17/30253 |

(Continued)

FOREIGN PATENT DOCUMENTS

WO 2008085857 A2 7/2008

OTHER PUBLICATIONS

Hsu, Ming-Hung, Ming-Feng Tsai, and Hsin-Hsi Chen. "Combining WordNet and ConceptNet for automatic query expansion: a learning approach." Information Retrieval Technology (2008): 213-224.*

(Continued)

*Primary Examiner* — William Spieler
(74) *Attorney, Agent, or Firm* — Isaac J. Gooshaw

(57) ABSTRACT

A processor expands a search expression. The processor determines nodes representing query terms of a search expression. The nodes have associated text for search term expansion, and represent at least one concept in a semantic graph of nodes that represents a domain of semantically related concepts. The processor determines i) a center of focus within the semantic graph for the two or more nodes based, at least in part, on a spreading activation in the graph and ii) a contextual relevance for the two or more nodes with respect to node the center of focus. The processor selects, for a query term, a node based on contextual relevance between that node and the query term and expands the search expression using an associated text of that node.

18 Claims, 11 Drawing Sheets

(56) References Cited

U.S. PATENT DOCUMENTS

2006/0271887 A1* 11/2006 Bier .................. G06F 17/30905
715/866
2008/0263038 A1    10/2008 Judge et al.
2011/0302156 A1    12/2011 Vadlamani et al.
2015/0269139 A1*   9/2015 McAteer ........... G06F 17/30734
704/9

OTHER PUBLICATIONS

Bouchoucha, Arbi, Jing He, and Jian-Yun Nie. "Diversified query expansion using conceptnet." Proceedings of the 22nd ACM international conference on Conference on information & knowledge management. ACM, 2013.*

Shabanzadeh, Mozhgan, Mohammad Ali Nematbakhsh, and Naser Nematbakhsh. "A Semantic based query expansion to search." Intelligent Control and Information Processing (ICICIP), 2010 International Conference on. IEEE, 2010.*

Kotov, Alexander, and ChengXiang Zhai. "Tapping into knowledge base for concept feedback: leveraging conceptnet to improve search results for difficult queries." Proceedings of the fifth ACM international conference on Web search and data mining. ACM, 2012.*

Wikipedia, Spreading Activation (Jun. 10, 2015, accessed Jan. 8, 2018 at https://en.wikipedia.org/w/index.php?title=Spreading_activation&oldid=666384028).*

Tsatsaronis, George, Michalis Vazirgiannis, and Ion Androutsopoulos. "Word Sense Disambiguation with Spreading Activation Networks Generated from Thesauri." IJCAI. vol. 7. 2007. (Year: 2007).*

Carpineto et al, "A Survey of Automatic Query Expansion in Information Retrieval", ACM Comput. Surv. 44, 1, Article 1, Jan. 2012, 50 pages.

Dong et al., "Ontology Graph based Query Expansion for Biomedical Information Retrieval", 2011 IEEE International Conference on Bioinformatics and Biomedicine, © 2011, IEEE Computer Society, pp. 488-493, DOI 10.1109/BIBM.2011.15.

Freitas et al, "Querying Linked Data Graphs using Semantic Relatedness: A Vocabulary Independent Approach", Data & Knowledge Engineering, May 1, 2013, pp. 1-32.

Mac an Tsaoir, Ronan, "Using Spreading Activation to Evaluate and Improve Ontologies", Proceedings of COLING 2014, the 25th International Conference on Computational Linguistics: Technical Papers, Dublin, Ireland, Aug. 23-29, 2014, pp. 2237-2248.

Nastase et al., "Generating Update Summaries with Spreading Activation", in Proceedings of the Text Analysis Conference, 2008, Captured Jun. 23, 2015, 9 pages.

Ngo, Vuong M., "Discovering Latent Informaion by Spreading Activation Algorithm for Document Retrieval", International Journal of Artificial Intelligence & Applications (IJAIA), vol. 5, No. 1, Jan. 2014, pp. 23-34.

Mac an Tsaidir et al., "Context Sensitive Query Expansion", U.S. Appl. No. 14/865,174, filed Sep. 25, 2015.

List of IBM Patents or Patent Applications Treated as Related, dated Sep. 22, 2015, pp. 1-2.

* cited by examiner

| Node ID | Associated Text/ Surface Forms | Related Node ID | Associated Text/ Surface Forms |
|---|---|---|---|
| Q1 | India*, Bhārat Gaṇarājya, Republic of India, Indian Republic | Q1a, Q1b, Q1c, Q1d, Q1e | Calcutta, Delhi, Rajagriha, Ganges, Hinduism |
| Q2 | capital*, capital city, seat of government, centre | Q2a, Q2b, Q2c, Q2d | Delhi, Dublin, London, Paris |
| Q3 | capital*, excellent | Q3a, Q3b, Q3c, Q3d | fantastic, great, exemplary, spiffing |
| Q4 | capital*, monetary assets, wealth | Q4a, Q4b, Q4c, Q4d | collateral, currency, money, real-estate |
| Q5 | first*, earliest | Q5a | initial |
| Q6 | first*, foremost | Q6a | best |
| Q7 | first*, primary | Q7a | principal |

FIG. 5

What was the first capital of India?

| Query Term | Query node/s | Surrounding nodes | Contextual Relevance (Used as expansion Candidates Yes or No) | |
|---|---|---|---|---|
| | | | Unbalanced | Balanced |
| India | Q1 | Q1a Q1b Q1c Q1d Q1e | 0.1 (No) | 0.9 (Yes) |
| capital | Q2 | Q2a Q2b Q2c Q2d | - (No) | 0.9 (Yes) |
| | Q3 | Q3a Q3b Q3c Q3d | - (No) | - (No) |
| | Q4 | Q4a Q4b Q4c | 0.9 (Yes) | - (No) |
| first | Q5 | Q5a | - (No) | 0.5 (Yes) |
| | Q6 | Q6a | 0.5 (Yes) | - (No) |
| | Q7 | Q7a | - (No) | - (No) |

FIG. 9

CONTEXT SENSITIVE QUERY EXPANSION

BACKGROUND OF THE INVENTION

The present invention relates generally to the field of query processing, and more particularly to context sensitive query expansion.

The fields of information retrieval and natural language processing may benefit from many of the same techniques. A natural language user query input to a search engine system may be analyzed and modified so as to increase the likelihood of a correct response being returned. Example techniques include: synonym expansion; word sense disambiguation; and spell correction.

A query is modified or expanded to include new words, or variations of existing words, in order to improve the recall of the system. Such a modification or expansion can involve generalizing the query such that: with synonym expansion, alternative text can be found with the same meaning and update the query accordingly. With word-sense disambiguation, the meaning of a word can be located in the context of the query, so that results that are not relevant to this context can be filtered out. Other technologies exist that leverage semantic graphs for query expansion, that use concepts discovered in the query to traverse a graph's structure in order to help identify other related concepts (and as a result alternative query text) which are semantically related to the original query. The use of data from these related concepts increase the likelihood that a useful result will be returned. For example "school of dolphins" in a search query could be coupled with or replaced with "pod of dolphins" and/or "educational institution of dolphins".

SUMMARY

Embodiments of the present invention provide a method, system, and program product for expanding a search expression. A processor determines two or more nodes representing two or more query terms of a search expression, wherein the two or more nodes have associated text for search term expansion and represent at least one concept in a semantic graph of nodes that represents a domain of semantically related concepts. The processor determines a center of focus within the semantic graph for the two or more nodes based, at least in part, on a spreading activation in the graph. The processor determines a contextual relevance for the two or more nodes with respect to the center of focus. The processor selecting, by the one or more processors, for a query term, which is included in the two or more query terms of the search expression, at least one node from the two or more nodes based, at least in part, on contextual relevance between the at least one node and the query term. The processor expanding, by the one or more processors, the search expression using an associated text of the at least one node.

BRIEF DESCRIPTION OF THE SEVERAL VIEWS OF THE DRAWINGS

Embodiments of the present invention will now be described with reference to the following drawings in which:

FIG. 5 is a table listing the nodes and associated nodes in FIG. 4, together with their associated textual surface forms that may be used as expansion candidates in the search expression, in accordance with an exemplary embodiment of the present invention;

FIG. 9 is a table listing terms in the search expression and nodes in the graph that share a common meaning, in accordance with an exemplary embodiment of the present invention.

DETAILED DESCRIPTION

Figure 1:
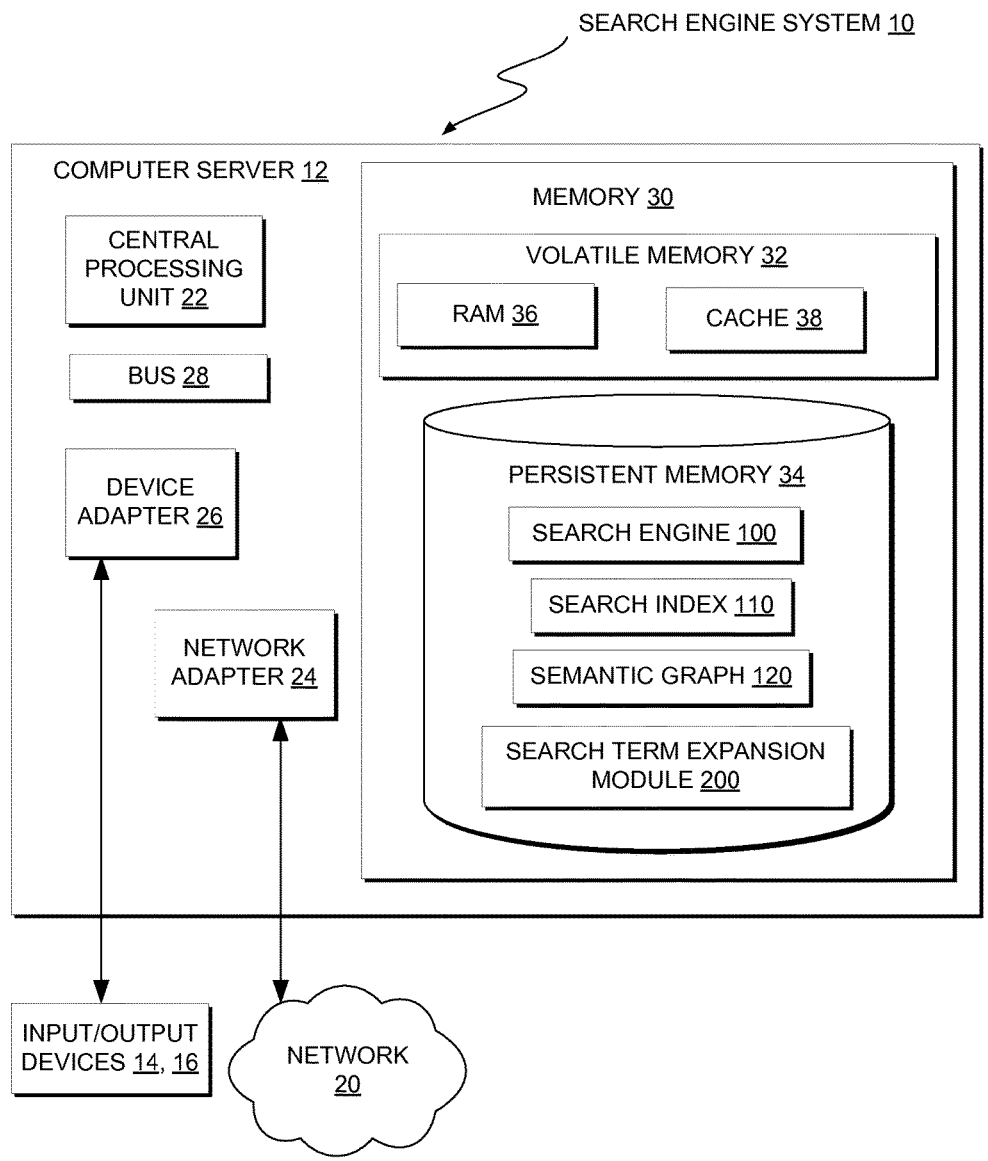
FIG. 1 is a deployment diagram, in accordance with an exemplary embodiment of the present invention.

Embodiments of the present invention recognize that one drawback with many query expansion techniques is that they are generally limited to the use of words which have a direct correlation of synonymy or other lexical relationship. Other words, which are semantically related but not in these categories (for example paracetamol and headache), will not be possible.

Embodiments of the present invention recognize that a drawback with many query expansion techniques is that implemented graph structures are often over simplified forms of an ontology and would not use the graph to constrain possible inferences. Additionally, there is no way to customize the use of the graph for the query expansion task, a task for which the graph was not originally developed.

Embodiments of the present invention provide an improvement to at least the field of query processing by providing one or more of: i) increased use of words that have a direct correlation of synonymy or other lexical relationship, and semantically related words, ii) a graph to constrain possible inferences, and iii) a modified graph that is customized for query expansion tasks.

Embodiments of the present invention operate in the general environment of information retrieval, for example in a search engine system, as well as the related domain of question answering, including natural language query expansion.

The present invention will now be described in detail with reference to the Figures.

In one embodiment of the present invention there is provided a system for expanding a search expression, said system comprising: a semantic graph of nodes representing a domain of semantically related concepts, where each node in the graph represents a concept or meaning and at least two nodes (which, in some embodiments, increases to all nodes) have associated text that may be used for search term expansion; a search term extractor for determining two or more nodes representing two or more query terms in the search expression; a focus engine for determining a center of focus for the two or more determined nodes in the semantic graph by a process of spreading activation in the semantic graph; a context comparator for determining contextual relevance for the two or more determined nodes with respect to the center of focus; an expansion candidate selector for selecting determined nodes based on the strongest contextual relevance for each node; and a search term expander for expanding the search expression with the associated text of the selected nodes.

In one embodiment of the present invention the contextual relevance is determined by a process of assessing the semantic similarity of these nodes.

In one embodiment of the present invention selecting one or more nodes is further based on constraints that are appropriate for performance or semantic relevance of expansion candidates.

In general, search terms, as used, herein include any type of term suitable for use in a search including surface forms, query strings and/or textual representations.

In one embodiment of the present invention, determining a center of focus for two or more nodes in a graph has a word-sense disambiguation effect for nodes that have common surface forms. Such nodes are considered ambiguous as the same surface form is found associated with multiple meanings, for example, "capital" as in "capital city" or "monetary capital". Once a focus node is determined, ambiguous nodes that are less semantically similar to the focus node can be ignored as out of context, greatly improving the semantic relevance and consequent quality of the final set of query expansion candidates.

One embodiment of the present invention uses a flexible graph-based approach that uses spreading activation to infer semantic relatedness of query terms, and to rank expansion candidates by accumulated activation weight on associated nodes in the graph.

One embodiment of the present invention uses activation weight, or relatedness measures, to configure an information retrieval query so as to boost or reduce the impact of related query terms in the return of candidate results, based on their perceived relevance.

In one embodiment of the present invention, semantic links and categories identified in the original query expression are used to modify the impact on spreading activation signal decay of specific links and categories, as they are encountered during spreading activation of the graph. For instance, on locating a link or category that exists in the query, semantic relevance of associated nodes in the graph can be augmented by boosting the spreading activation signal at this point. Similarly, in the case of encountering alternative or semantically disparate links and categories in the graph, the spreading activation signal could be diminished more strongly. This approach provides a more robust and flexible method for context-sensitive semantic expansion of query text when compared to spreading activation methods that perform simple fan-out activation.

In one embodiment of the present invention, with prior statistical analysis of the underlying corpus and consequent optimization of the signal weighting strategy, the approach is adaptable to any domain context and semantic resource pairing. In one embodiment and scenario, prior statistical analysis also decreases the likelihood that the rarity or underdeveloped nature of particular query terms will impede their semantic relevance after spreading activation. The rarity or underdeveloped nature of particular query terms impeding their semantic relevance after spreading activation can occur when using traditional spreading activation approaches.

In one embodiment of the present invention, prior static analysis of the semantic graph with respect to context sensitive graph theoretical metrics can demonstrate inherent imbalance of semantic depth for particular portions of the graph. Such an imbalance is common in knowledge based approaches that leverage resources for tasks for which the resource is not originally developed. In one embodiment of the present invention, by modifying the signal weighting strategy that controls how the spreading signal will decay as it traverses the graph structure, a discovered imbalance is redressed optimally for the specific use case. Further, that imbalance is handled without modifying the underlying semantics of the graph itself, which would require the input of domain experts to ensure semantic integrity.

In one embodiment of the present invention, the use of node weight following activation as a contextual relevance measure for query terms has a more realistic semantic basis than other techniques that typically use general metrics like corpus frequency, co-occurrence matrices, or page-rank measures that have no semantic quality.

In one embodiment of the present invention, a term that has multiple meanings has a node for each meaning in a semantic graph.

In one embodiment of the present invention, a method of expanding a search term expression is provided comprising: determining two or more nodes representing two or more query terms in the search expression, wherein each node has associated text that may be used for search term expansion and each node represents a concept in a semantic graph of nodes representing a domain of semantically related concepts; determining a center of focus within the semantic graph for the two or more determined nodes by a process of spreading activation in the graph; determining contextual relevance for the two or more determined nodes with respect to node the center of focus; selecting nodes from the determined nodes for each query term based on the strongest contextual relevance of the determined nodes; and expanding the search expression using the associated text of the selected nodes.

In one embodiment of the present invention, selecting nodes is based on the strongest contextual relevance for each node comprises selecting a determined node with highest contextual relevance for each query term.

In one embodiment of the present invention, selecting nodes is further based on filtering selected nodes that have a contextual relevance over a threshold relevance. In one embodiment of the present invention, the contextual relevance value increases with increasing contextual relevance and vice versa.

In one embodiment of the present invention, the spreading optimization is optimized to balance over connected and under connected nodes.

One embodiment of the present invention ranks each selected node by its contextual relevance following spreading activation and center of focus determination.

One embodiment of the present invention builds the graph from a structured data source or from unstructured data. The structured data source has an inherent semantic quality, such as columns and rows in a database, or in the case of hyperlinks linking webpages, or any such inter-concept connectivity. The unstructured data has an inherent semantic quality such as dependency parses on natural language text, or any pattern recognition in text, images or other media. Semantic information can be extracted from such sources using existing techniques, and a graph of semantic concepts and inter-concept relationships constructed using this information.

One embodiment of the present invention identifies categories of semantic concept and relationship in the search expression and modifying the impact on signal decay of related links and node categories in the graph, as they are encountered during spreading activation. Examples of this are to increase rate of decay for links and nodes with categories that do not exist in the original search expression, or to boost signal at links and nodes with categories that do exist in the original search expression.

One embodiment of the present invention performs static analysis of the constructed graph, using a set of graph theoretical metrics, in order to discover inherent imbalance or lack of depth in portions of the data source. Discovered imbalance can be used to modify the configuration of other system components such as spreading activation and expansion candidate ranking.

One embodiment of the present invention configures signal spread for optimally balanced activation of the graph for any input search expression. In one embodiment of the present invention, such an approach reduces signal decay for over connected and under connected nodes. A more detailed set of example graph theoretical metrics are provided elsewhere in this document.

In one embodiment of the present invention there is provided a computer program product for expanding a search term expression, the computer program product comprising a computer readable storage medium having program instructions embodied therewith, the program instructions executable by a processor to cause the processor to: determine two or more nodes representing two or more query terms in the search expression, wherein each node has associated text that may be used for search term expansion and each node represents a concept in a semantic graph of nodes representing a domain of semantically related concepts; determine a center of focus within the semantic graph for the two or more determined nodes by a process of spreading activation in the graph; determine contextual relevance for the two or more determined nodes with respect to node the center of focus; select nodes from the determined nodes for each query term based on the strongest contextual relevance of the determined nodes; and expand the search expression using the associated text of the selected nodes.

In one embodiment of the present invention there is provided a computer program stored on a computer readable medium and loadable into the internal memory of a digital computer, comprising software code portions, when said program is run on a computer, for: determining two or more nodes representing two or more query terms in the search expression, wherein each node has associated text that may be used for search term expansion and each node represents a concept in a semantic graph of nodes representing a domain of semantically related concepts; determining a center of focus within the semantic graph for the two or more determined nodes by a process of spreading activation in the graph; determining contextual relevance for the two or more determined nodes with respect to node the center of focus; selecting nodes from the determined nodes for each query term based on the strongest contextual relevance of the determined nodes; and expanding the search expression using the associated text of the selected nodes.

Referring to FIG. 1, a deployment of one embodiment of search engine system 10 is described, in accordance with an exemplary embodiment of the present invention. In one embodiment, search engine system 10 is operational with numerous other general purpose or special purpose computing system environments or configurations. Examples of well-known computing processing systems, environments, and/or configurations that may be suitable for use with search engine system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment for example where computer processing systems are distributed as a network of objects that can interact with a computing service.

Search engine system 10 may be described in the general context of computer system-executable instructions, such as program modules, being executed by a computer processor. Generally, program modules may include routines, programs, objects, components, logic, and data structures that perform particular tasks or implement particular abstract data types. Search engine system 10 may be embodied in distributed cloud computing environments where tasks are performed by remote processing devices that are linked through a communications network. In a distributed cloud computing environment, program modules may be located in both local and remote computer system storage media including memory storage devices.

In the illustrated embodiment, search engine system 10 comprises: computer server 12 and one or more input devices 14 and output devices 16 directly attached to the computer server 12. Search engine system 10 is connected to a network 20. Search engine system 10 communicates with a user 18 using input devices 14 and output devices 16. Input devices 14 include one or more of: a keyboard, a scanner, a mouse, trackball or another pointing device. Output devices 16 include one or more of a display or a printer. Search engine system 10 communicates with network devices (not shown) over network 20. Network 20 can be a local area network (LAN), a wide area network (WAN), or the Internet.

In the illustrated embodiment, computer server 12 comprises: central processing unit (CPU) 22; network adapter 24; device adapter 26; bus 28 and memory 30. In various embodiments of the present invention, computer server 12 is a computing device that can be a standalone device, a server, a laptop computer, a tablet computer, a netbook computer, a personal computer (PC), or a desktop computer. In another embodiment, computer server 12 represents a computing system utilizing clustered computers and components to act as a single pool of seamless resources. In general, computer server 12 can be any computing device or a combination of devices with access to hardware, software and data such that it is capable of executing context sensitive query expansion and semantic graph generation, in accordance with an exemplary embodiment of the present invention. In some embodiments, computer server 12 may include internal and external hardware components, as depicted and described in further detail with respect to FIG. 10.

In this exemplary embodiment, software and data used for executing context sensitive query expansion and semantic graph generation, for example, search engine 100, search index 110, semantic graph 120, and search term expansion module 200, are stored as part of memory 30. However, in other embodiments, software and data used for executing context sensitive query expansion and semantic graph generation may be stored externally and accessed through a communication network, such as network 20. Network 20 can be, for example, a local area network (LAN), a wide area network (WAN) such as the Internet, or a combination of the two, and may include wired, wireless, fiber optic or any other connection known in the art. In general, network 20 can be any combination of connections and protocols that will support communications between computer server 12 and the software and data used for executing context sensitive query expansion and semantic graph generation, in accordance with a desired embodiment of the present invention.

In the illustrated embodiment, CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. In one embodiment, a typical CPU 22 can perform many different machine operations. A set of machine instructions is called a machine code program, the machine instructions are written in a machine code language, which is referred to a low level language. In one embodiment, a computer program written in a high level language needs to be compiled to a machine code program before it can be run. Alternatively, in one embodiment, a machine code program such as a virtual machine or an interpreter can interpret a high level language in terms of machine operations.

In the illustrated embodiment, network adapter 24 is connected to bus 28 and network 20 for enabling communication between the computer server 12 and network devices.

In the illustrated embodiment, device adapter 26 is connected to bus 28 and input devices 14 and output devices 16 for enabling communication between computer server 12 and input devices 14 and output devices 16.

In the illustrated embodiment, bus 28 couples the main system components together including memory 30 to CPU 22. In general, in one embodiment, bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

In the illustrated embodiment, memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Search engine system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

As illustrated, the set of program modules configured to carry out the functions of one embodiment comprises: search engine 100; search index 110; semantic graph 120; and search term expansion module 200. In one embodiment, ROM in the memory 30 stores search term expansion module 200 that enables the computer server 12 to function as a special purpose computer specific to the module 200. As illustrated, further program modules that support the embodiment, but are not shown, include firmware, a boot strap program, an operating system, and support applications. Each of the operating system, support applications, other program modules, and program data or some combination thereof, may include an implementation of a networking environment.

In the illustrated embodiment, search engine system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with search engine system 10. Examples, include, but are not limited to: microcode, device drivers, redundant processing units, external disk drive arrays, redundant array of independent disks (RAID), tape drives, and data archival storage systems.

In the illustrated embodiment, search engine 100 is configured to take a search expression input from a user, which includes search terms. Search engine 100 is configured to i) search for those terms in search index 110, and to ii) provide an output of search results for the user.

In the illustrated embodiment, search index 110 includes an index of search terms and links to Web pages or documents on a network or the Internet.

In the illustrated embodiment, semantic graph 120 is a graphical structure derived from a set of semantic data. This data can be in the form of an ontology or other relational information such as database rows and columns or parse frames from natural language text. The graph structure consists of nodes and links corresponding to semantic concepts and inter-concept relationships.

In the illustrated embodiment, search term expansion module 200 is configured to take a search expression and expand the terms in the search expression according to semantically related data included in semantic graph 120, which increases the comprehensive context of a sensitive search query.

Figure 2:
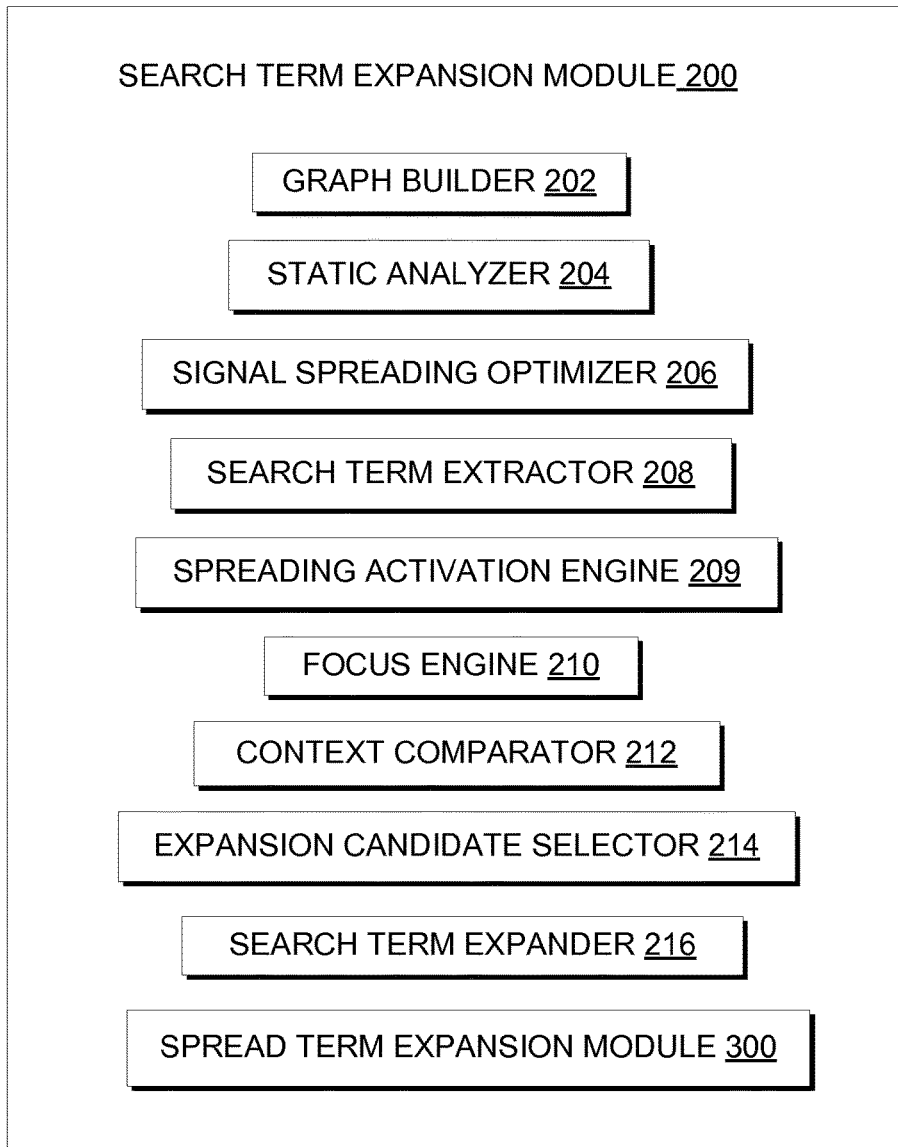
FIG. 2 is a component diagram, in accordance with an exemplary embodiment of the present invention.

Referring to FIG. 2, as illustrated, search term expansion module 200 comprises the following components: graph builder 202; static analyzer 204; signal spreading optimizer 206; search term extractor 208; spreading activation engine 209; focus engine 210; context comparator 212; expansion candidate selector 214; search term expander 216; and search term expansion module 300.

In the illustrated embodiment, graph builder 202 is configured to build a graph comprising nodes and links from semantic data derived from either structured or unstructured information, representing domain specific knowledge, by existing methods.

In the illustrated embodiment, static analyzer 204 is configured to perform static analysis of the graph using static graph theoretical metrics in order to discover inherent imbalance in the graph that should hinder a spreading activation. In one embodiment and scenario, following static analysis of the graph, a configuration for the query expansion task is determined for all spreading activation metadata. In one embodiment and scenario, patterns in under and over-connected nodes in the graph, such as common semantic categories and links, are used to strategically boost or decay the signal at these points in the graph. A more detailed description of one such static analysis is described later on in this paper.

In the illustrated embodiment, signal spreading optimizer 206 is configured to re-balance of the spreading activation algorithms and metadata by considering an optimal configuration of weighting strategy for the spreading signal, taking into account metadata for separate nodes, and different categories of semantic types and links.

In the illustrated embodiment, search term extractor 208 is configured to i) determine two or more nodes representing two or more search terms in a search expression, and ii) determine text associated with the nodes and ambient or other contextually relevant nodes in the graph.

In the illustrated embodiment, spreading activation engine 209 is configured to provide spreading activation functionality to the components and methods including; focus engine 210; context comparator 212; and expansion candidate selector 214, and is optimized using output from static analyzer 204. Spreading activation engine 209 activates determined nodes in the graph structure and propagates a spreading signal through the graph from these starting points. Metadata describes weighting configuration for individual nodes, types and inter-node links control how the spreading signal decays and accumulates as it traverses the graph. Additional metadata attached to the graph describes starting signal weight and the default amount of signal decay that happens when a node is traversed.

In the illustrated embodiment, focus engine 210 is configured to determine a center of focus for determined nodes by a process of spreading activation in the graph by identifying the node (the focus node) with most accumulated spreading signal.

In the illustrated embodiment, context comparator 212 is configured to determine the contextual relevance for the determined nodes and surrounding nodes by assessing semantic similarity with respect to the center of focus. In one embodiment and scenario, disambiguation of nodes that derive from the same query term are performed by one embodiment, to reduce noise from irrelevant meanings of the same words.

In the illustrated embodiment, expansion candidate selector 214 is configured to i) select a determined node with highest contextual relevance for each query term, and ii) filter selected nodes for contextual relevance over a threshold. In one embodiment and scenario, expansion candidate selector 214 is thus configured to select one or more expansion candidates based on the contextual relevance for the nodes and expansion candidates.

In the illustrated embodiment, search term expander 216 is configured to expand search expressions using associated text for selected and filtered nodes.

In the illustrated embodiment, search term expansion module 300 is configured to control components of search term expansion module 200 (components numbered 202-216) to perform at least a portion of context sensitive query expansion and semantic graph generation using a series of logical process steps as described below.

Figure 3A:
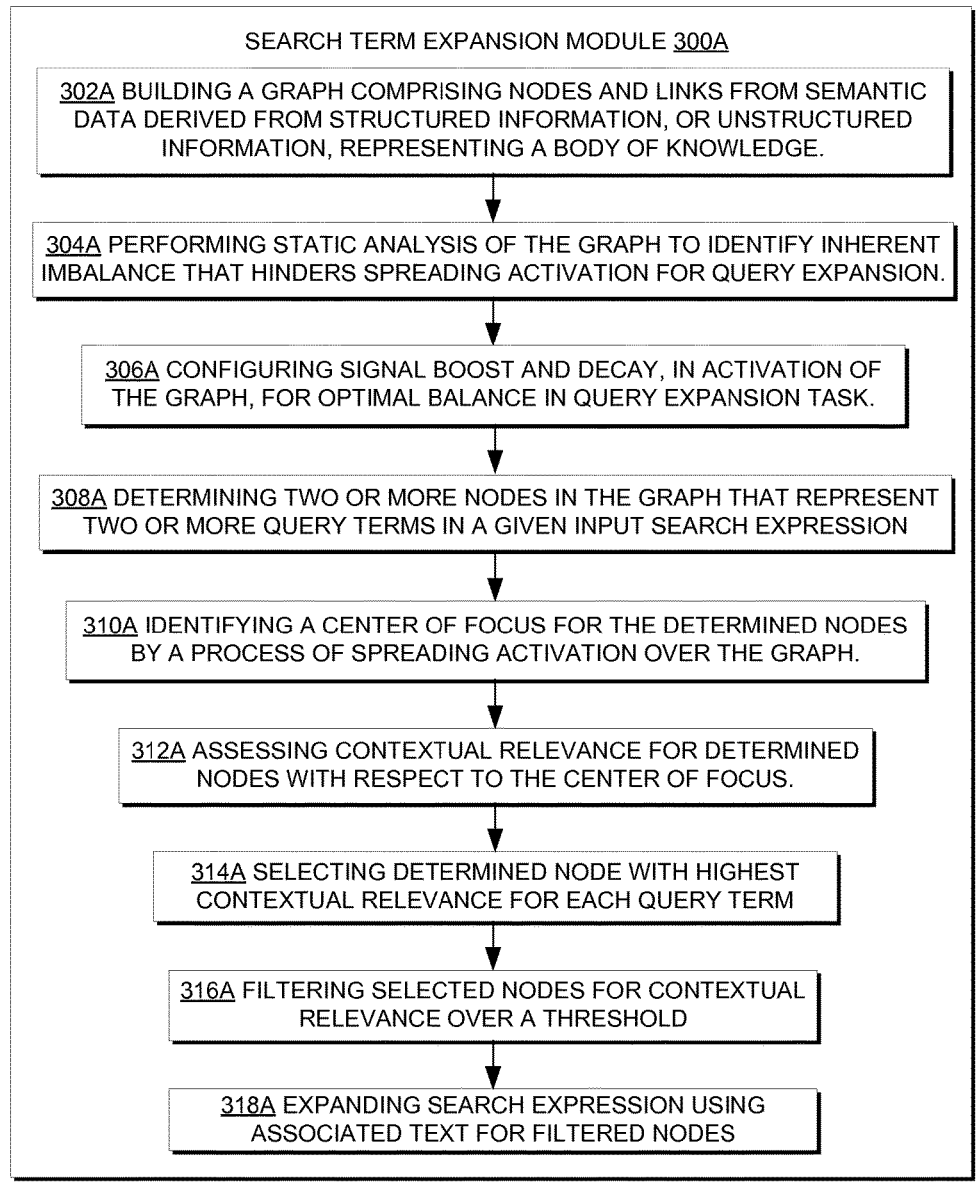
FIG. 3A is a flow diagram of a process, in accordance with an exemplary embodiment of the present invention.
Figure 3B:
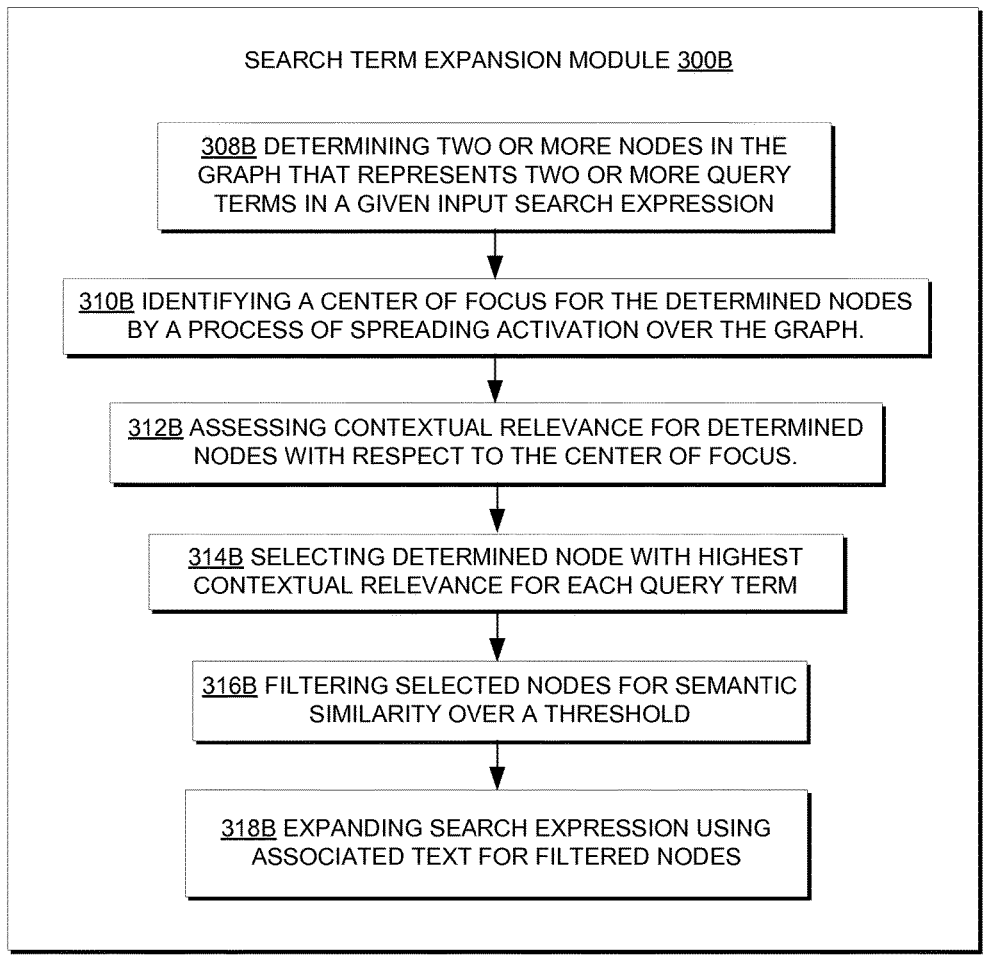
FIG. 3B is a flow diagram of a process, in accordance with an exemplary embodiment of the present invention.

Referring to FIG. 3A, an embodiment of search term expansion module 300 is illustrated as search term expansion module 300A, and comprises logical process steps 302A to 318A of FIG. 3A. In an alternative embodiment, an embodiment of search term expansion module 300 includes search term expansion module 300B and comprises logical process steps 308B to 318B of FIG. 3B that are, in one embodiment, performed independently of the graph forming steps when a balanced graph already exists.

In step 302A, a graph comprising nodes is built and links from semantic data are derived from either structured information, or unstructured information, representing a body of knowledge by existing methods. The source data for this step consists of semantic concepts (or entities) and inter concept relationships that exist between concepts in the data. In graph terminology these concepts and links would be vertices and edges. Prior processing should identify concepts in the user query that correspond to individual nodes in the graph, typically using an alphanumeric unique identifier such as or universal resource locator value. Ambiguous output from this process would result in the identification of multiple such identifiers for the same piece of text, and correspondingly multiple nodes in the graph.

The construction of the graph could be done in many different ways. One example would be to generate directly from the corpus text using predicate argument structure (output from a natural language dependency parser). Another would be to take an existing semantic Web ontology (or standard knowledge graph) and derive a suitable graph structure from the ontology and associated instance data. Some existing standard ontologies include the Unified Medical Language System (UMLS) for the medical domain, and the Financial Industry Business Ontology (FIBO) for the financial domain. The chosen ontology should provide an identifier system that suits the purposes of graph generation from instance data. In the case of UMLS, this is provided as a concept unique identifier (CUI), but such a system can be developed from scratch for a new domain or terminology using any unique alphanumeric or URL based identifier mechanism, ensuring that normal and alternative surface forms for the same concept are all linked by the same unique identifier.

In step 304A, static analysis is performed on the graph in order and inherent imbalance in the graph is thereby discovered. Domain specific gaps in semantic detail and other structural weakness can hinder an effective spreading activation. The terms imbalanced and unbalanced refer to over connected and under connected nodes. Different adjustments to the spreading activation configuration are made depending on whether the signal is excessively hindered or overly spread by a given unbalanced node. The impact of specific types and links in the graph in the context of such imbalance is also considered. In step 304A, reweighting the signal depending on such details is also performed. In step 304A, varying the rate at which signal is amplified or diminished while traversing specific unbalanced nodes in the graph is also performed. In some embodiments and scenarios, a certain amount of assessment of ontology semantics is performed before the graph is actually used. In some embodiments and scenarios, certain characteristics of nodes may be examined in the graph using a set of graph theoretical metrics, and those portions of the graph that are not conducive to spreading activation may be identified.

In step 306A, configuring signal spread for a balanced graph is performed. In the embodiment, a balanced graph is generated by configuring the algorithm and metadata that controls spreading activation engine 209. Optionally, configuring signal spread is by a process of trial and error, using a set of examples to configure the signal spread metadata to test how the spread signal propagates throughout the graph in the example set, and then to adjust the metadata that directs spread signal propagation until a balanced propagation is found. In a further embodiment, the signal spread algorithm and signal spread metadata are fixed and configuration of the underlying graph node weights allows for a balanced signal spread. In a further alternative embodiment, relevant concept weights, concept category weights, and concept link weights, are manipulated. In some embodiments, configuring signal spread for a balanced graph is aided by statistical analysis of the corpus text for common co-occurrences and patterns of concept types and links, as well as static analysis of the semantic graph.

In some embodiments and scenarios, statistical analysis using graph theoretical metrics is performed on a graph in order to discover areas of the underlying semantic resource that are not helpful for spreading activation or which suggest that further development of that resource would be necessary. In some embodiments and scenarios, an extension of this technique that specifically targets the task of query expansion, incorporates domain corpus statistics, and is specifically designed in order to ensure maximal recall in information retrieval. In some embodiments and scenarios, such an approach helps ensure that terms that are potentially critical to the user's query (even though their presence in the graph is not representative of this fact) are still be treated as similarly critical by the search engine system.

In step 308A and step 308B, two or more nodes in the graph that represent two or more query terms in a given input search expression are determined. In step 308A and step 308B, expansion candidates associated with the two or more nodes and their ambient nodes or nodes in the surrounding context of the graph are also determined. In general, in step 308A and step 308B, concepts in a text query that has been submitted by a user are identified. In some embodiments and scenarios, upon receipt of a user query, the text is processed using standard natural language processing techniques for lexical analysis and concept identification. Other techniques such as word sense disambiguation and spell/grammar correction may be used to increase the likelihood of finding a concept from the concept graph to an ambiguous concept in the text. Identified concepts are assigned identifiers that are stored for use in step 304A.

In step 310A and step 310B, a center of focus for the determined nodes is identified by a process of spreading activation over the graph. These steps proceed to activate a sub graph of nodes around the context of any identified query term nodes. Activating is performed by propagating a signal through the graph according to the characteristics of optimized signal weighting strategy. The graph, either pre-existing or built earlier in the embodiment, is activated separately for each node discovered in steps 308A and 308B and signal accumulates at adjacent nodes as it spreads. After activation has completed, the center of focus, or focus node, is identified as the node with the most accumulated signal weight. Propagation of the signal through the graph can be performed by any spreading activation or graph-traversal algorithm so is not described further. Examples of variations of such algorithms are: page rank and derivatives; and marker passing.

In Step 312A and step 312B are for determining contextual relevance of the determined query nodes by assessing semantic similarity of these nodes with respect to the center of focus. One type of semantic similarity is a node distance in node space, or the number of intervening nodes between the determined query node and the focus node. Another example is to use activation weights of these same intervening nodes in calculating a similarity score. Yet another is to examine the associated semantic categories or types of the focus node, along with any categories of ingoing/outgoing links, and then to compare these values with the categories and links of the query-term node in calculating the semantic similarity measure. Any combination of the associated metadata and graph structure may be used in calculating semantic similarity.

Since the determined nodes are simultaneously activated, the focus node determines the central theme of the user's query in terms of the graph semantics. The main goal of ranking nodes by contextual relevance is in order to filter out irrelevant query terms, which will reduce the quality of the search query, and thereby reduce the quality of results returned from an IR system. Accordingly, those query terms which are more relevant to the context will be given a significant boost, further improving the result.

In step 314A and step 314B a determined node with highest contextual relevance for each query term is selected. This is performed for a scenario where a single query term activates multiple nodes, reflecting a conflict in meaning for the query term in the domain semantics represented in the graph, and this ambiguity is resolved by selecting the highest scoring node from the set of ambiguous nodes. Other nodes in this set are removed from further processing.

In step 316A and step 316B one or more expansion candidates are selected based on the contextual relevance for the nodes and expansion candidates. Specifically steps 316A and 316B filter selected nodes for contextual relevance over a threshold context relevance value. Selection may rely on contextual relevance or semantic similarity scores being over a specified threshold. Additionally, the contextual relevance or semantic similarity scores can, in some embodiments, be used to weight the relevance of a query term within the final search query expression. Such a relevance score for retrieval ranking can, in some embodiments, be configured to use values from the original query term semantic similarities, that is, a separate value per term, or even a harmonic mean of all semantic similarities that are derived from the same source. This process can also be performed for combinations of query terms (for example, use all or just top few) with the discovered terms from step 308.

In step 318A and step 318B the search expression/terms are expanded using associated text for the filtered nodes. In some embodiments and scenarios, for performance considerations, a limitation on the number of expansion terms may be appropriate whereby the candidates are ranked by any semantic similarity measure, or a harmonic mean of such scores. In one embodiment, candidates are ranked by the shortest path between the source node of expansion candidates and an identified focus node. In another embodiment, semantic similarity is the number of variations in semantic links and semantic types that must be traversed in the graph in order to join the source node for the expansion candidate and the focus node. In another embodiment semantic similarity could involve either of the two distance metrics above, applied to any two expansion candidate nodes.

Results returned from the search engine system are now much more likely to contain a relevant response for the user's query and likelihood is increased by tuning of the described system to characteristics of the domain (for example, ontology, graph, corpus, weighting strategy, contextual relevance calculation). Parameters of the embodiment can be configured automatically using the same statistical analysis of the corpus and static analysis of the graph structure as described.

The static analysis of the graph using static graph theoretical metrics allows modifications to be made to the weighting strategy for spreading activation, as described previously. Example graph theoretical metrics are: InDegree—a metric for inward semantic links; OutDegree—a metric for outward semantic links; TotalDegree—a metric for (InDegree+OutDegree); ETV (inward edge type variation)—a metric for inward edge types; OutwardETV—a metric for outward edge types; and TotalETV—a metric for (Inward ETV+Outward ETV).

Following the use of these metrics, and the gathering of associated statistics, particular groups of node are categorized in order to apply a common weighting strategy that maximizes performance of the spreading activation algorithm. Examples of nodes that might negatively affect spreading activation are: isolated nodes, where TotalDegree is 0; unbalanced nodes, where InDegree and OutDegree are significantly different; nodes with few variations in link type, or low TotalETV; 'Black Hole' nodes, where there is a high TotalDegree to ETV ratio.

For each of the above groups of nodes, a separate modification can be made to the overall weighting strategy. For isolated nodes, the set of associated semantic categories can be examined and their starting weight boosted if appropriate. For unbalanced nodes, where the InDegree is significantly higher or lower than the OutDegree, the decay factor can be increased or decreased accordingly, to reduce the imbalance of the spreading signal. For nodes with low ETV but high TotalDegree, the decay factor can be decreased in order to reduce the potential influence of a single overly used semantic link. For overly promiscuous or 'Black Hole' nodes, the starting weight applied by the associated semantic categories can be reduced as well as increasing the rate of decay. These modifications can optionally be tested independently using a known gold standard data set, in order to verify that an increase in overall accuracy was achieved.

In certain cases, the intended modifications can be incompatible, and may result in conflicting changes to the graph and weighting strategy. For example, where a certain node might require a boost from one semantic category, the starting weight for the same category may likewise need to be reduced, due to its association with an overly-connected node elsewhere in the graph. In such cases and for certain embodiments, the negatively connected node alone can be inhibited, ignoring the potential gain to the node that required a boost for semantic relevance. In some scenarios and embodiments, such a decision is made based on the results of testing using a set of standard data, where an increase in system accuracy from reducing noise in activation is observed.

Figure 4:
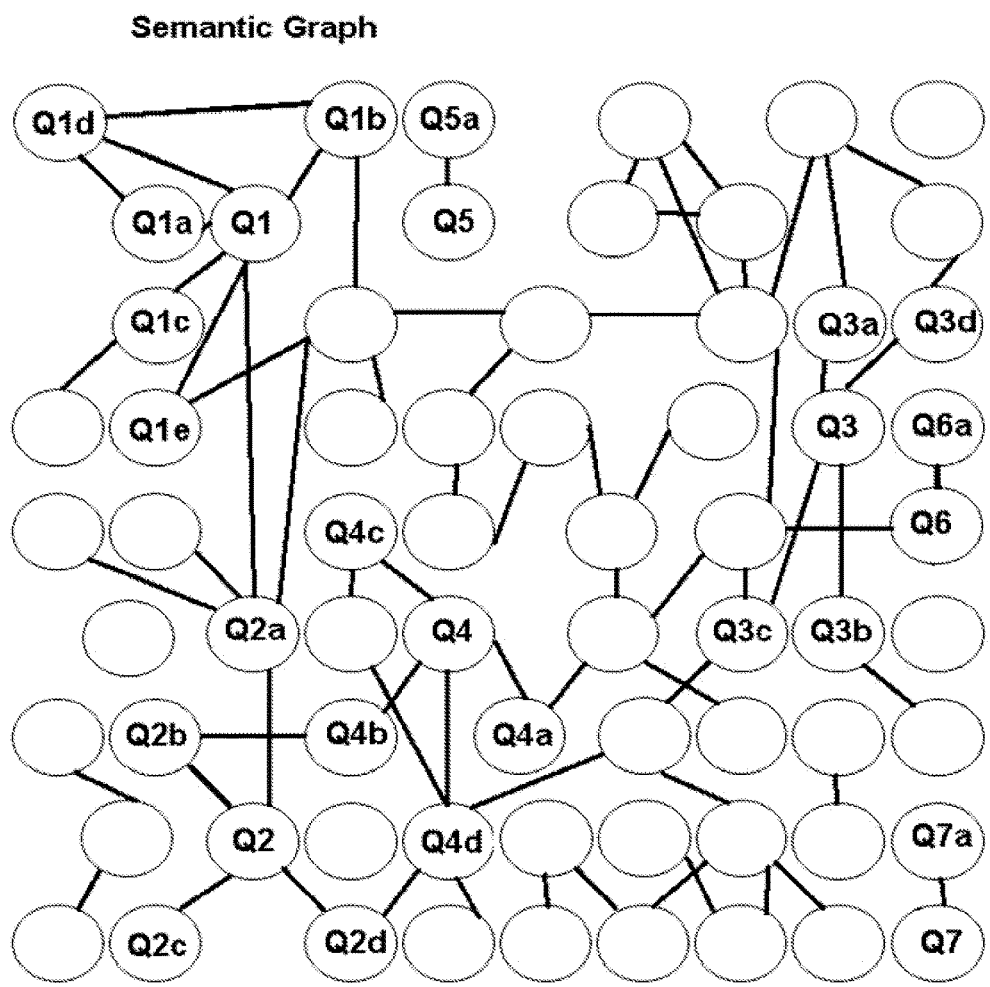
FIG. 4 is a schematic example of a semantic graph data structure representing a domain of semantically related but concepts, where every node in the sematic graph represents a concept or meaning for a search term relevant to an example, in accordance with an exemplary embodiment of the present invention.

Referring to FIG. 4, an example of a semantic graph data structure is shown representing a domain of semantically related concepts, where every node in the semantic graph represents a concept or meaning for a search term relevant to an example of the present embodiment. Characteristics of typical semantic graphs are apparent here: a) the graph is not required to be fully interconnected, b) links can go between any two nodes in the graph, c) nodes in the graph may have multiple links to multiple other nodes, d) certain nodes in the graph may not have any links to other nodes at all, e) different portions of the graph may be connected significantly more than others.

Referring to FIG. 5, the nodes identifiers and associated text and/or surface forms are described. The associated textual/surface forms that may be used as expansion candidates in the search expression, and an assertion as to whether or not these terms would be used in a balanced configuration. The asterisk (*) character highlights terms found in the original query. The reasons for ambiguous nodes also becomes more apparent here, due to the overlapping surface forms. The improvement to a process of selecting an expansion candidate following balanced activation of the graph is also apparent, where the most relevant meaning of a word is correctly identified. Q1 represents the combined concept of: India*, Bharat Ganarajya, Republic of India, Indian Republic. Associated nodes Q1a, Q1b, Q1c, Q1d and Q1e represent the separate concepts of: Calcutta, Delhi, Rajagriha, Ganges, and Hinduism respectively. Q2 represents the combined concept of capital*, capital city, seat of government, and center. Related nodes Q2a, Q2b, Q2c, and Q2d represent the separate concepts of: Delhi, Dublin, London, and Paris respectively. Q3 represents the combined concept of: capital*, and excellent. Related nodes Q3a, Q3b, Q3c, Q3d represent the separate concepts of: fantastic, great, exemplary, and spiffing. Q4 represents a combined concept of: capital*, monetary assets, and wealth. Related nodes Q4a, Q4b, Q4c, Q4d represent the separate concepts of: collateral, currency, money, and real-estate respectively. Q5 represents the combined concept of: first*, and earliest. Associated node Q5a represents the concept of initial. Node Q6 represents the combined concept of: first* and foremost. Related node Q6a represents the concept of best. Node Q7 represents the combined concept of: first* and primary. Associated node Q7a represents the concept of principal.

Figure 6:
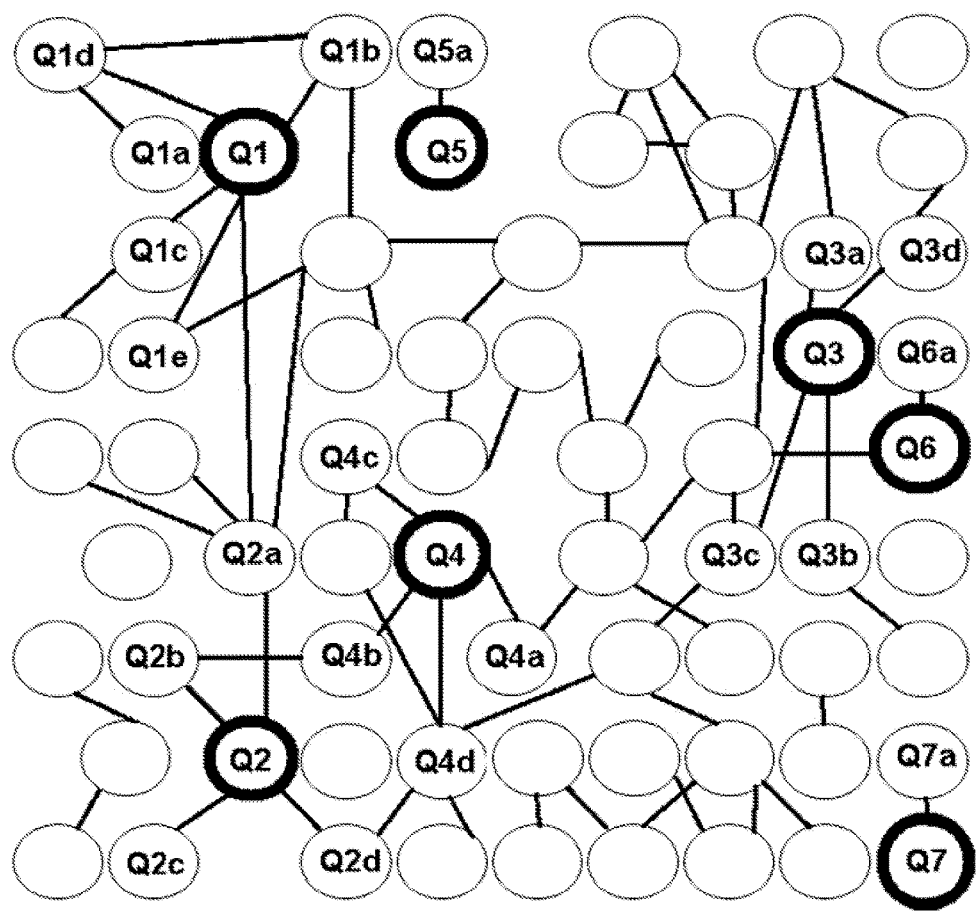
FIG. 6 is a schematic example based on FIG. 4, with additional highlighting of nodes in the graph that have a corresponding query term from the search expression "What was the first capital of India?", in accordance with an exemplary embodiment of the present invention.

Referring to FIG. 6, a schematic example of highlighted query nodes in a graph without calculating a node focus is described for a search expression comprising "What was the first capital of India?" Note that certain terms in the query have multiple associated meanings and a corresponding number of nodes in the graph. These nodes are the starting points for spreading activation. The schematic example, for illustrative purposes, resembles an array of nodes in a two dimensional graph whereas the embodiment is actually a three or more dimensional structure. Seven of the nodes are query nodes present in the search expression and identified as: India (Q1); capital (Q2, Q3, Q4); and first (Q5, Q6, Q7). In the case of "capital" and "first", there are three separate meanings of these words, and each of these meanings has a separate node that is activated in the graph. These nodes have associated ambient nodes, or surrounding context nodes, which may also be useful for potential query expansion candidates. All nodes in the graph have an associated set of surface forms which are used to link the query text with the graph nodes, and also to derive new query expansion candidates. The set of surface forms associated with each node in the context of the example are listed in FIG. 5.

Figure 7:
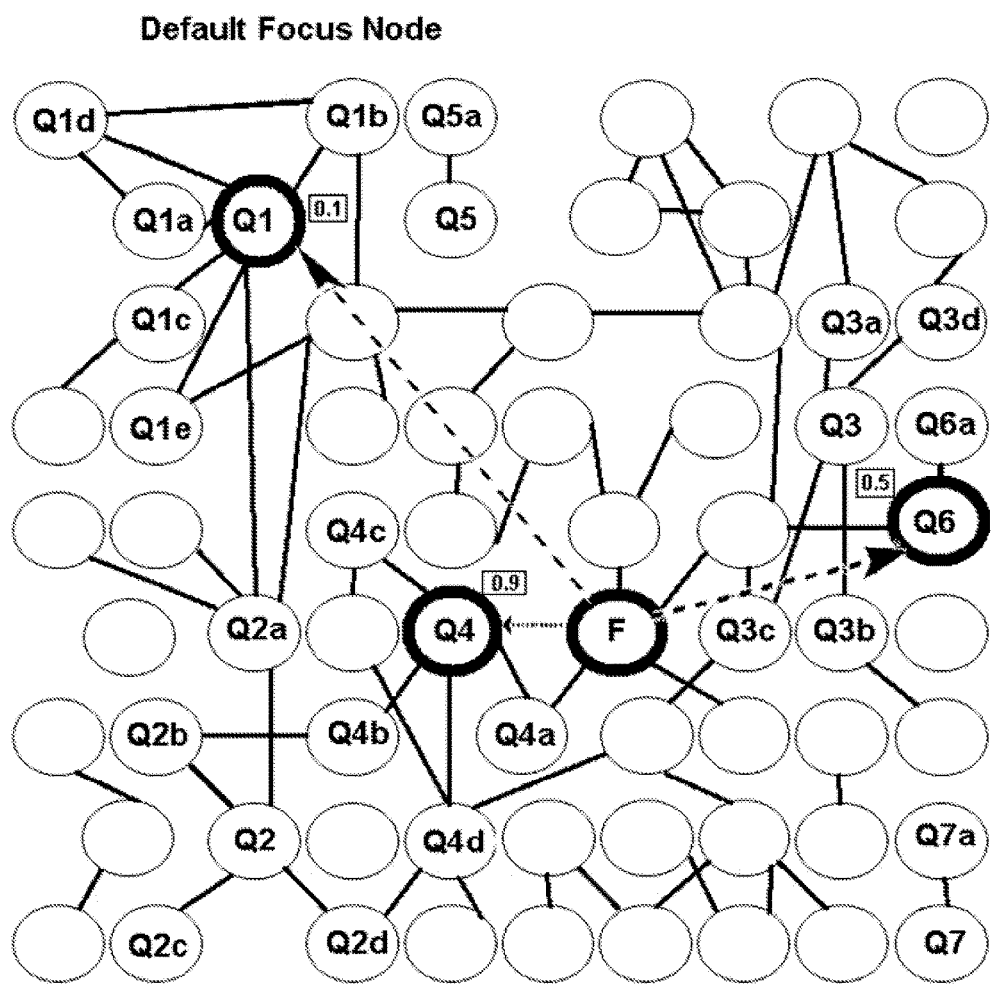
FIG. 7 is a schematic example of highlighted query nodes for an unbalanced embodiment that has a graph with unbalanced spreading activation, demonstrating a focus node that results in a less valuable selection of query expansion candidates, in accordance with an exemplary embodiment of the present invention.

Referring to FIG. 7, a schematic example of highlighted query nodes for a graph with unbalanced spreading activation that demonstrates a focus node that results in a less valuable selection of query expansion candidates. Some modification of signal weighting strategy would be appropriate, either by prior statistical analysis of the graph using graph theoretical metrics, or other means. The effect of a threshold for contextual relevance is also demonstrated here, resulting in the removal of a primary query term (Q1) from further processing, as its contextual relevance score 0.1 is below the configured threshold of 0.2

In the unbalanced graph example of FIG. 7, denoted "default focus node" in FIG. 7, no optimization has been applied to the spreading activation. A determined focus node (F1) is very much central to the graph structure. Nodes that share a surface form are ambiguous, and choosing the correct meaning of a word is critical for context sensitive query expansion. The proposed disambiguation method is to select the node from the ambiguous set that has the highest semantic similarity score. In this case, the nodes Q4 and Q5 are chosen, which are incorrect. Additionally, if a node's contextual relevance score is below a specified threshold (for example 0.2), then such nodes will also be ignored. Q1 is therefore ignored for query expansion in this example, which is a serious error in the context of the query.

Arrows from the focus node to each of the remaining query nodes are labeled with a similarity value. Surface forms from the remaining nodes may be chosen according to the relative contextual relevance of associated nodes. For example, a node with twice the score of another, could have twice as many query expansion candidates used in the search query.

Figure 8:
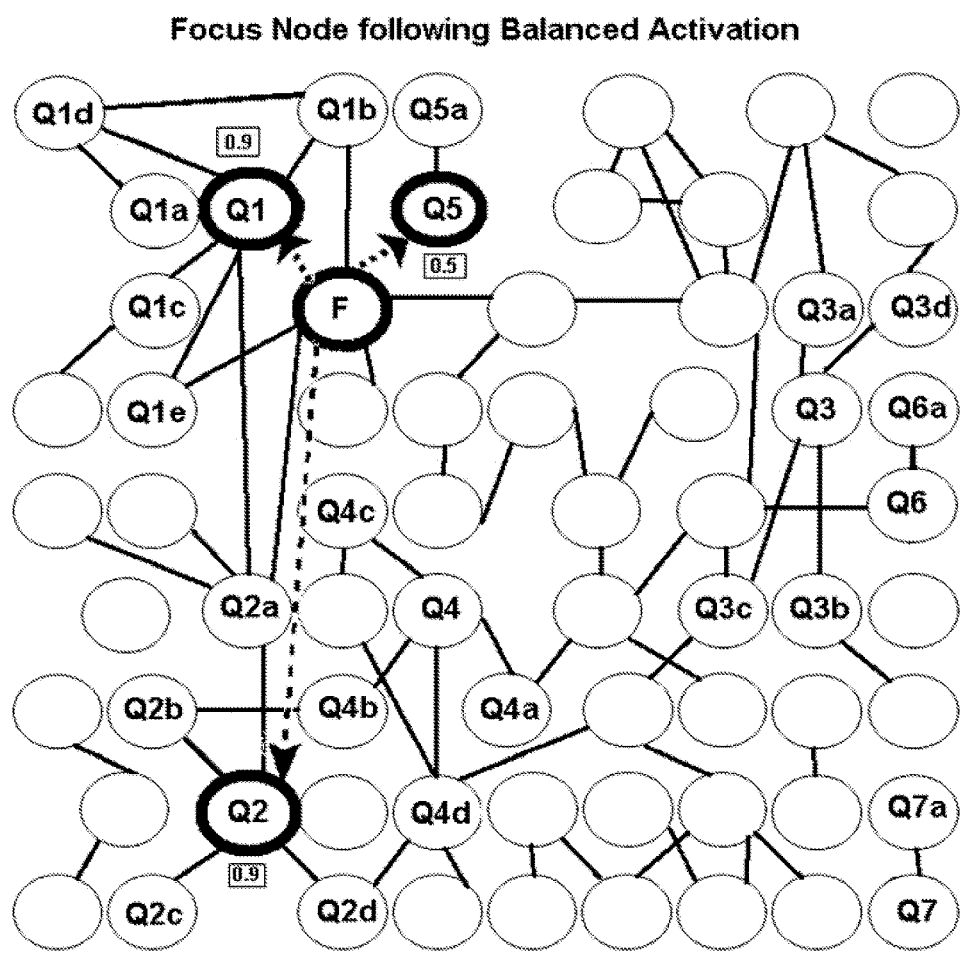
FIG. 8 is a schematic example of highlighted query nodes for a balanced embodiment that has a graph with balanced spreading activation, demonstrating a new focus node that results in more valuable selection of query expansion candidates, in accordance with an exemplary embodiment of the present invention.

Referring to FIG. 8, a schematic example of highlighted query nodes for a graph with balanced spreading activation, denoted "focus node following balanced activation" in FIG. 8, demonstrates a new focus node that results in more valuable selection of query expansion candidates. As a result of configuration of spreading signal weight, the focus becomes more sensitive to the context of the query text. Additionally, it is demonstrated that all remaining nodes also have a contextual relevance score above the specified threshold of 0.2. Optimization has been applied following static analysis of the graph and an optimization of signal weight configuration, the accumulation of signal weight is now distributed differently. In this example the new focus node (F2) is much closer to the correct contextual relevance of the query text, and the set of remaining nodes is now much more useful for query expansion.

Referring to FIG. 9, a table lists query terms with associated nodes; further associated nodes; and the respective contextual relevance for unbalanced and balanced spreading activation. The surrounding nodes that immediately surround the query node in question are also listed, as these are considered contextually relevant by association and may be used, together with the query node itself, to select query expansion candidates. In this example, even though India is important in the query, the graph activation process identified a focus node that was too far removed or too dissimilar. An unbalanced contextual relevance of 0.1 is below an example threshold 0.2 and so the associated text for Q1 (India*, Bharat Ganarajya, Republic of India, Indian Republic) is not used as an expansion candidate (and nor are the surrounding nodes). On the other hand, for the balanced graph, the contextual relevance of 0.9 is above the example threshold of 0.2 and the associated text for Q1 (India*, Bharat Ganarajya, Republic of India, Indian Republic) is used as an expansion candidate, The balanced embodiment the surrounding nodes are also considered as expansion candidates and this may depend on their individual contextual relevance.

Considering the query term capital which has three nodes, only the highest scoring node is preserved for query expansion and Q4 has 0.9 in the unbalanced graph of FIG. 7 and Q4's associated text (capital*, monetary assets, wealth) is used as an expansion candidate (so not the associated text for query node Q2 and Q3). For the balanced graph of FIG. 8, Q2 has a contextual relevance of 0.9 and Q2's associated text (capital*, capital city, seat of government, centre) is used as an expansion candidate (but not the associated query text for query node Q3 and Q4).

Considering the query term 'first' which has three associated nodes. Q6 in the unbalanced graph of FIG. 7 has the highest contextual relevance of 0.5 and its associated text (first*, foremost) is used as an expansion candidate. Q5 is the balanced graph FIG. 8 has the highest contextual relevance of 0.5 and its associated text (first*, earliest) is used as the expansion candidate.

Further embodiments of the present invention are now described. It will be clear to one of ordinary skill in the art that all or part of the logical process steps of an embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

Figure 10:
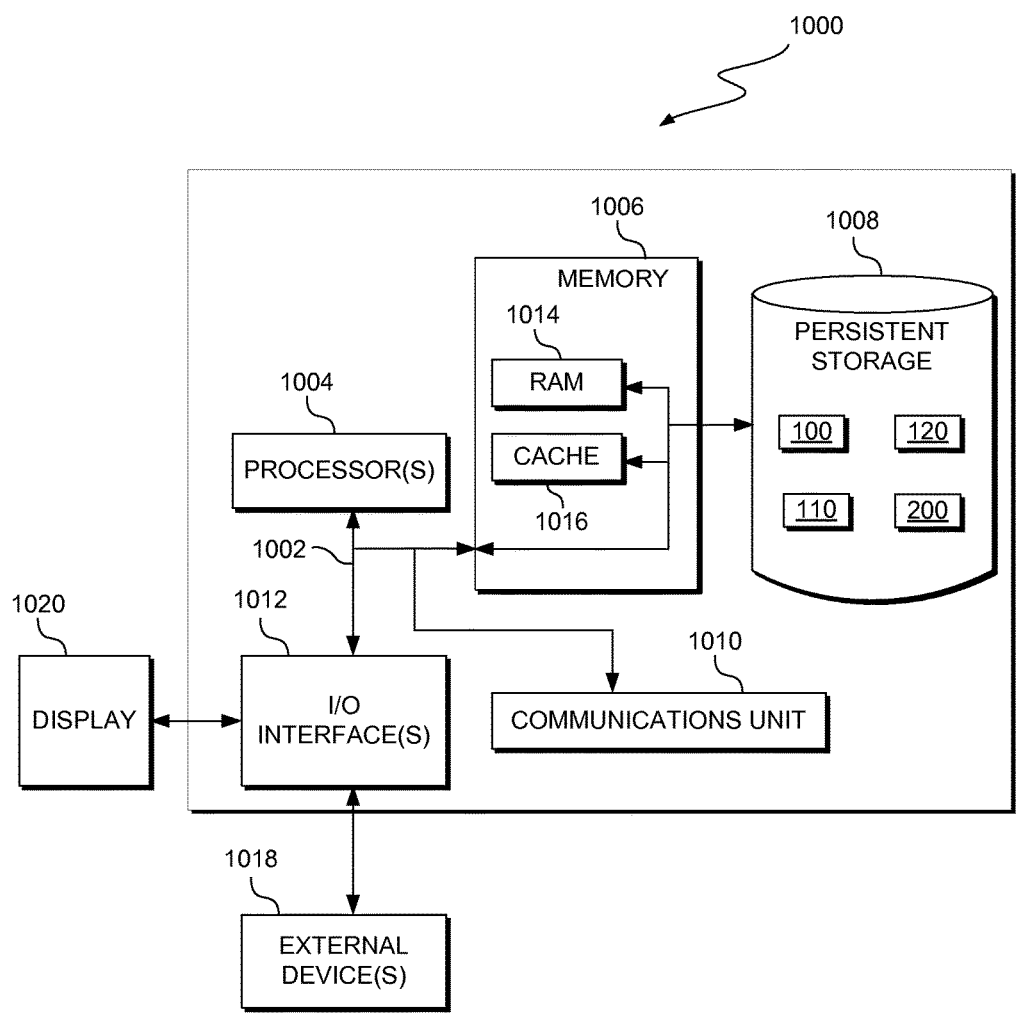
FIG. 10 depicts a block diagram of components of the computing device executing context sensitive query expansion and semantic graph generation, in accordance with an exemplary embodiment of the present invention.

FIG. 10 depicts a block diagram, 1000, of components of computer server 12, in accordance with an illustrative embodiment of the present invention. It should be appreciated that FIG. 10 provides only an illustration of one implementation and does not imply any limitations with regard to the environments in which different embodiments may be implemented. Many modifications to the depicted environment may be made.

Computer server 12 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer-readable storage media. In this embodiment, memory 1006 includes random access memory (RAM) 1014 and cache memory 1016. In general, memory 1006 can include any suitable volatile or non-volatile computer-readable storage media.

The software and data used for executing context sensitive query expansion and semantic graph generation are stored in persistent storage 1008 for execution and/or access by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer-readable storage medium that is also part of persistent storage 1008.

Communications unit 1010, in these examples, provides for communications with other data processing systems or devices, including resources of network 20. In these examples, communications unit 1010 includes one or more network interface cards. Communications unit 1010 may provide communications through the use of either or both physical and wireless communications links. The software and data used for executing context sensitive query expansion and semantic graph generation may be downloaded to persistent storage 1008 through communications unit 1010.

I/O interface(s) 1012 allows for input and output of data with other devices that may be connected to computer server 12. For example, I/O interface 1012 may provide a connection to external devices 1018 such as a keyboard, keypad, a touch screen, and/or some other suitable input device. External devices 1018 can also include portable computer-readable storage media such as, for example, thumb drives, portable optical or magnetic disks, and memory cards. Software and data used to practice embodiments of the present invention, e.g., search engine 100, search index 110, semantic graph 120, and search term expansion module 200, can be stored on such portable computer-readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It will be clear to one skilled in the art that many improvements and modifications can be made to the foregoing exemplary embodiment without departing from the scope of the present invention.

It is to be noted that term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer program product for a search engine, the computer program product comprising:
one or more computer-readable storage media and program instructions of the search engine stored on the one or more computer-readable storage media, the program instructions comprising:
program instructions to receive a search expression;
program instructions to extract, using a search term extractor of the search engine, two or more query terms of the search expression;
program instructions to determine two or more nodes representing a first term of the two or more query terms and at least one node representing a second term of the two or more query terms, wherein the two or more nodes each have an associated text for search term expansion and represent at least one concept in a semantic graph of nodes that represents a domain of semantically related concepts;
program instructions to determine a center of focus within the semantic graph for the two or more nodes based, at least in part, on a spreading activation in the semantic graph;
program instructions to determine a contextual relevance for the two or more nodes with respect to the center of focus based, at least in part, on an assessment of semantic similarity for the two or more nodes with respect to the center of focus;
program instructions to select for a query term, which is included in the two or more query terms of the search expression, at least one node from the two or more nodes based, at least in part, on a contextual relevance between the at least one node and the determined center of focus;
program instructions to generate an expanded search expression by expanding the search expression using an associated text of the at least one node; and
program instructions to generate, by the search engine, an output of search results by executing a search using the expanded search expression.

2. The computer program product according to claim 1 wherein program instructions to select for a query term, which is included in the two or more query terms of the search expression, at least one node from the two or more nodes based, at least in part, on a contextual relevance between the at least one node and the determined center of focus include:
program instructions to select a determined node with a greatest contextual relevance for each query term.

3. The computer program product according to claim 1 wherein program instructions to select for a query term, which is included in the two or more query terms of the search expression, at least one node from the two or more nodes based, at least in part, on a contextual relevance between the at least one node and the determined center of focus include:
   program instructions to filter the two or more nodes based, at least in part, whether a given node of the two or more nodes has an amount of contextual relevance over a threshold for contextual relevance.

4. The computer program product according to claim 1, the program instructions comprising:
   program instructions to configure the spreading activation such that a balance between over-connected and under-connected nodes is generated.

5. The computer program product according to claim 1, the program instructions comprising:
   program instructions to rank the at least one node based, at least in part, on contextual relevance to the query term following spreading activation and a determination of center of focus.

6. The computer program product according to claim 1, the program instructions comprising:
   program instructions to build the graph using data from at least one of a structured data source and an unstructured data source.

7. The computer program product according to claim 1, the program instructions comprising:
   program instructions to identify processors, one or more categories of semantic concept and relationships in the search expression; and
   program instructions to modify impact on signal decay of related links and node categories in the graph as they are encountered during spreading activation.

8. The computer program product according to claim 1, the program instructions comprising:
   program instructions to perform a static analysis of the constructed graph, using a set of graph theoretical metrics; and
   program instructions to discover one or both of inherent imbalance and lack of depth in portions of a data source based, at least in part, on a result of the static analysis.

9. The computer program product according to claim 1, the program instructions comprising:
   program instructions to configure signal spread such that a balanced activation of the graph for any input search expression is generated.

10. A computer system with a search engine, the computer system comprising:
    one or more computer processors;
    one or more computer readable storage medium;
    program instructions of the search engine stored on the computer readable storage medium for execution by at least one of the one or more processors, the program instructions comprising:
      program instructions to receive a search expression;
      program instructions to extract, using a search term extractor of the search engine, two or more query terms of the search expression;
      program instructions to determine two or more nodes representing a first term of the two or more query terms and at least one node representing a second term of the two or more query terms, wherein the two or more nodes each have an associated text for search term expansion and represent at least one concept in a semantic graph of nodes that represents a domain of semantically related concepts;
      program instructions to determine a center of focus within the semantic graph for the two or more nodes based, at least in part, on a spreading activation in the semantic graph;
      program instructions to determine a contextual relevance for the two or more nodes with respect to the center of focus based, at least in part, on an assessment of semantic similarity for the two or more nodes with respect to the center of focus;
      program instructions to select for a query term, which is included in the two or more query terms of the search expression, at least one node from the two or more nodes based, at least in part, on a contextual relevance between the at least one node and the determined center of focus;
      program instructions to generate an expanded search expression by expanding the search expression using an associated text of the at least one node; and
      program instructions to generate, by the search engine, an output of search results by executing a search using the expanded search expression.

11. The computer system according to claim 10 wherein program instructions to select for a query term, which is included in the two or more query terms of the search expression, at least one node from the two or more nodes based, at least in part, on a contextual relevance between the at least one node and the determined center of focus include:
    program instructions to select a determined node with a greatest contextual relevance for each query term.

12. The computer system according to claim 10 wherein program instructions to select for a query term, which is included in the two or more query terms of the search expression, at least one node from the two or more nodes based, at least in part, on a contextual relevance between the at least one node and the determined center of focus include:
    program instructions to filter the two or more nodes based, at least in part, whether a given node of the two or more nodes has an amount of contextual relevance over a threshold for contextual relevance.

13. The computer system according to claim 10, the program instructions comprising:
    program instructions to configure the spreading activation such that a balance between over-connected and under-connected nodes is generated.

14. The computer system according to claim 10, the program instructions comprising:
    program instructions to rank the at least one node based, at least in part, on contextual relevance to the query term following spreading activation and a determination of center of focus.

15. The computer system according to claim 10, the program instructions comprising:
    program instructions to build the graph using data from at least one of a structured data source and an unstructured data source.

16. The computer program product according to claim 10, the program instructions comprising:
    program instructions to identify processors, one or more categories of semantic concept and relationships in the search expression; and
    program instructions to modify impact on signal decay of related links and node categories in the graph as they are encountered during spreading activation.

17. The computer program product according to claim 10, the program instructions comprising:

program instructions to perform a static analysis of the constructed graph, using a set of graph theoretical metrics; and program instructions to discover one or both of inherent imbalance and lack of depth in portions of a data source based, at least in part, on a result of the static analysis.

18. The computer program product according to claim 10, the program instructions comprising:

program instructions to configure signal spread such that a balanced activation of the graph for any input search expression is generated.

\* \* \* \* \*